United States Patent
Lindsay

(10) Patent No.: US 8,172,327 B2
(45) Date of Patent: May 8, 2012

(54) INTEGRATED SEAT FOLD-DOWN LEVER/BELT EXIT

(75) Inventor: Derek Shane Lindsay, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 358 days.

(21) Appl. No.: 12/391,658

(22) Filed: Feb. 24, 2009

(65) Prior Publication Data
US 2010/0213747 A1 Aug. 26, 2010

(51) Int. Cl.
*B60N 2/02* (2006.01)
(52) U.S. Cl. .................... 297/378.12; 297/378.1
(58) Field of Classification Search ............... 297/378.1, 297/378.12, 378.13, 378.14, 483
See application file for complete search history.

(56) References Cited

U.S. PATENT DOCUMENTS

| | | | |
|---|---|---|---|
| 4,234,209 A * | 11/1980 | Ikesue | 280/803 |
| 5,556,171 A | 9/1996 | Busch | |
| 5,597,206 A * | 1/1997 | Ainsworth et al. | 297/378.12 |
| 5,681,081 A * | 10/1997 | Lindner et al. | 297/216.13 |
| 6,786,551 B2 * | 9/2004 | Brewer et al. | 297/378.12 |
| 6,923,506 B2 | 8/2005 | Tanabe et al. | |
| 7,374,244 B2 * | 5/2008 | Becker et al. | 297/341 |
| 7,377,584 B2 * | 5/2008 | Griswold et al. | 297/216.12 |
| 7,458,644 B2 * | 12/2008 | Beermann et al. | 297/483 |
| 2004/0007909 A1 | 1/2004 | Bonk | |
| 2005/0067817 A1 | 3/2005 | Bostrom et al. | |
| 2007/0200410 A1 | 8/2007 | Inoue et al. | |
| 2008/0054703 A1 | 3/2008 | Okazaki | |

FOREIGN PATENT DOCUMENTS

KR 10-2005-0117993 12/2005
WO WO200613217 A1 * 12/2006

* cited by examiner

Primary Examiner — David Dunn
Assistant Examiner — Erika Garrett
(74) Attorney, Agent, or Firm — Rankin Hill & Clark LLP

(57) ABSTRACT

A vehicle seat assembly includes a vehicle seat fold down lever and a vehicle seat fold down lever housing. The housing can connect with the lever such that the lever is movable with respect to the housing. The housing can include an elongate slot through which an associated seat belt exits the housing. A vehicle seat is also described.

19 Claims, 3 Drawing Sheets

INTEGRATED SEAT FOLD-DOWN LEVER/BELT EXIT

BACKGROUND

The present disclosure generally relates to vehicle seats. More particularly, the present disclosure relates to a seat fold-down lever and a seat belt exit.

Many vehicles include seats where a seat back folds towards a base of the seat. Such seats are movable between an upright position and a collapsed position. With the seat in an upright position, an operator typically pulls a recliner/fold-down lever connected with a latch which allows the seat back to pivot towards the base into the collapsed position. It is known to include this recliner/fold-down lever near an outer shoulder area of a vehicle seat. This makes the lever easily accessible to a passenger of the vehicle when the passenger is entering or exiting the vehicle and the passenger desires to pivot the seat back toward the base of the seat.

Of course, seat belts are provided in association with vehicle seats, including with the type of vehicle seat described above. Vehicle seat belts are typically wound around a belt retractor assembly. The belt retractor assembly can be located inside the seat or in the vehicle frame. When the belt retractor assembly is located in the vehicle frame, the seat belt exits through an opening typically located on a pillar of the vehicle frame. Seat belts that are integrated within the vehicle seat typically exit the seat back through an opening near the shoulder area.

SUMMARY

An example of a vehicle seat assembly that can provide a more attractive appearance for a vehicle interior and that can reduce the number of components associated with a pivotal seat back and a seat belt includes a vehicle seat fold down lever and a vehicle seat fold down lever housing. The housing can connect with the lever such that the lever is movable with respect to the housing. The housing can include an elongate slot through which an associated seat belt exits the housing.

An example of a vehicle seat that can provide a more attractive appearance for a vehicle interior and that can reduce the number of components associated with a vehicle seat and a seat belt can include a pivotal seat back, a housing, a movable lever, and a seat belt. The housing can connect with the seat back and include a seat belt opening. The movable lever can connect with the housing. Movement of the lever can allow for pivotal movement of the seat back. The seat belt can be disposed in the seat back. A portion of the seat belt exits the seat back through the seat belt opening in the housing.

Another exemplary vehicle seat includes a pivotal seat back, a movable lever, and a seat belt. The pivotal seat back includes a seat back surface, a portion of which being contacted by the back of an associated vehicle occupant sitting on the vehicle seat. The seat back can be movable between an upright position and a collapsed position. The seat back can include a seat belt exit opening extending through the seat back surface adjacent an outer upper shoulder region of the seat back. The movable lever can connect with the seat back adjacent the outer upper shoulder region of the seat back. Movement of the lever can allow for pivotal movement of the seat back from the upright position. The seat belt can be at least partially disposed inside the seat back. A portion of the seat belt can exit the seat back through the seat belt exit opening.

DETAILED DESCRIPTION

Figure 1:
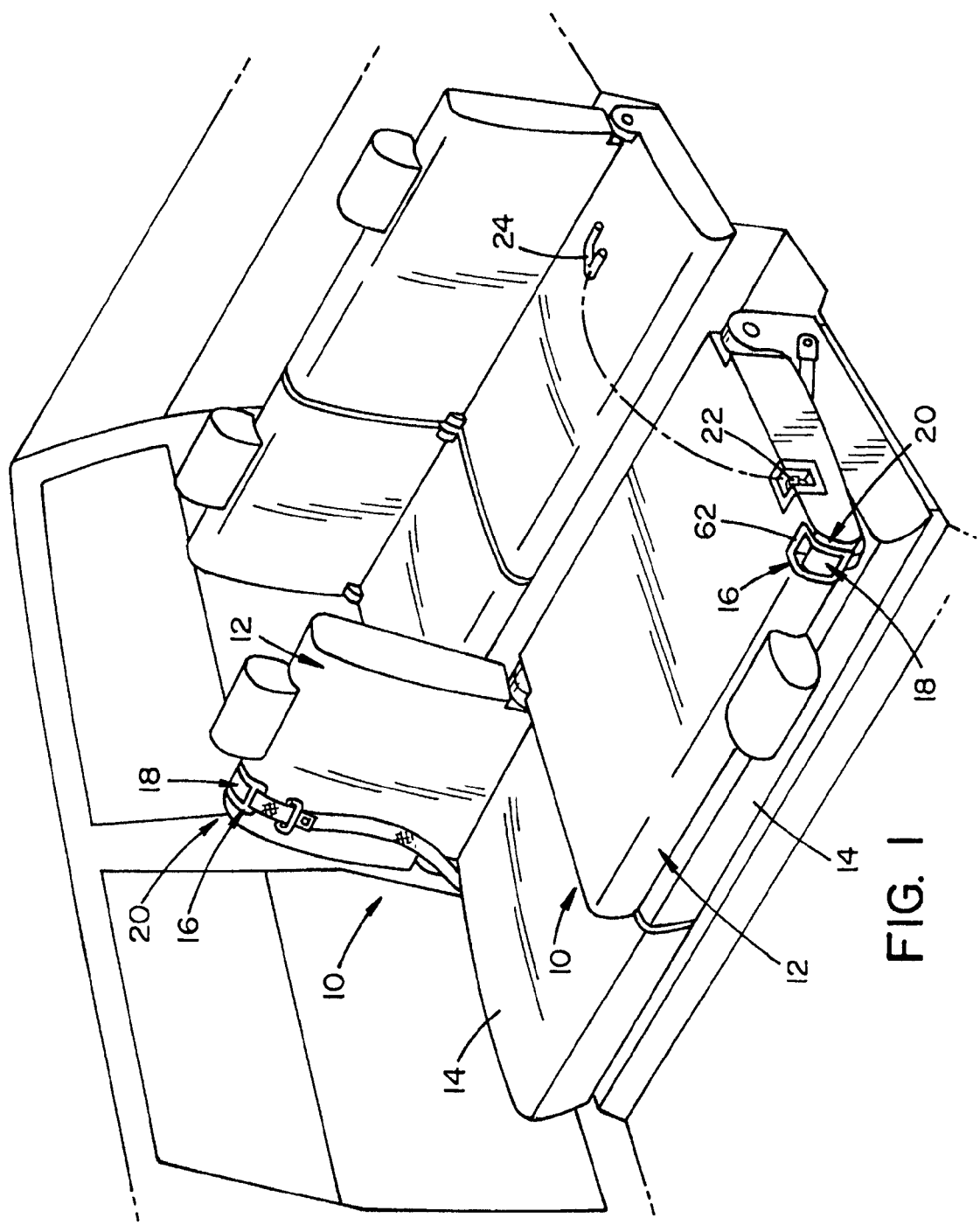
FIG. 1 is a perspective view of an interior of a vehicle including vehicle seats each having a seat base and a fold-down seat back.

With reference to FIG. 1, the interior of a vehicle is shown where the vehicle includes vehicle seats 10. For the vehicle depicted in FIG. 1, at least some of the vehicle seats 10 include a pivotal seat back 12 and a base 14. The seat back 12 can pivot between at least two positions: a first (upright) position, which is shown for the left forward vehicle seat 10 shown in FIG. 1, and a second (collapsed) position where the pivotal seat back 12 rests on the base 14. The right forward vehicle seat 10 depicted in FIG. 1 is shown in the collapsed position.

The forward vehicle seats 10 shown in FIG. 1 each include a housing 16 connected with the seat back 12 and a movable lever 18 connected with the housing. The housing 16 and the lever 18 can make up components of a vehicle seat assembly 20 that can provide the extraordinary advantages of removing a seat belt exit from a vehicle pillar to provide a cleaner more attractive interior and locating the components associated with moving the seat back and restraining a vehicle occupant in a neat compact package.

The lever 18, which can be provided without the housing that is depicted in FIG. 1, connects with the seat back 12 adjacent an outer upper shoulder region of the seat back. More particular to the embodiment depicted in the FIGS., the lever 18 can be provided at an upper edge of the seat back 12 and can be generally horizontally oriented when the seat back is in the upright position and the lever is in the retracted position. Movement of the lever 18 allows for pivotal movement of the seat back 12 from the upright position to the collapsed position, which will be described in more detail below.

Figure 2:
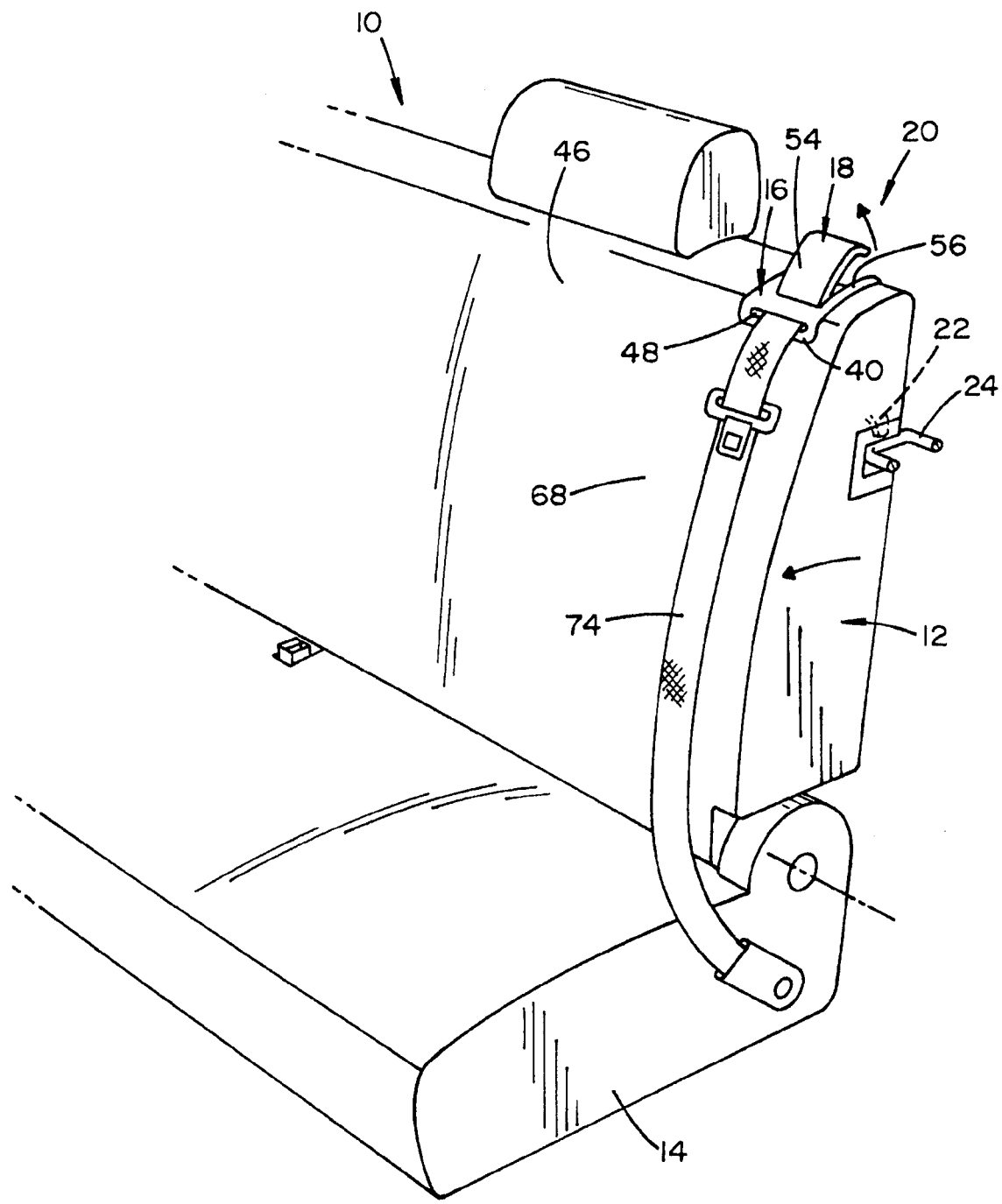
FIG. 2 is a partial perspective view of one of the vehicle seats shown in FIG. 1.

The lever 18 is operatively connected with a latch 22. With reference to FIG. 2, movement, e.g., pivotal movement, of the lever 18 results in movement, e.g., pivotal movement, of the latch 22. The latch 22 is normally biased to engage a striker 24, which is connected to the vehicle frame (not shown in FIG. 2) so that when the latch 22 is engaged with the striker 24 the seat back 12 is maintained or locked in the upright position. Accordingly, the latch 22 is configured to cooperate with the striker 24. Also, the seat back is in a latched position when the latch 22 is engaged with the striker 24.

Figure 3:
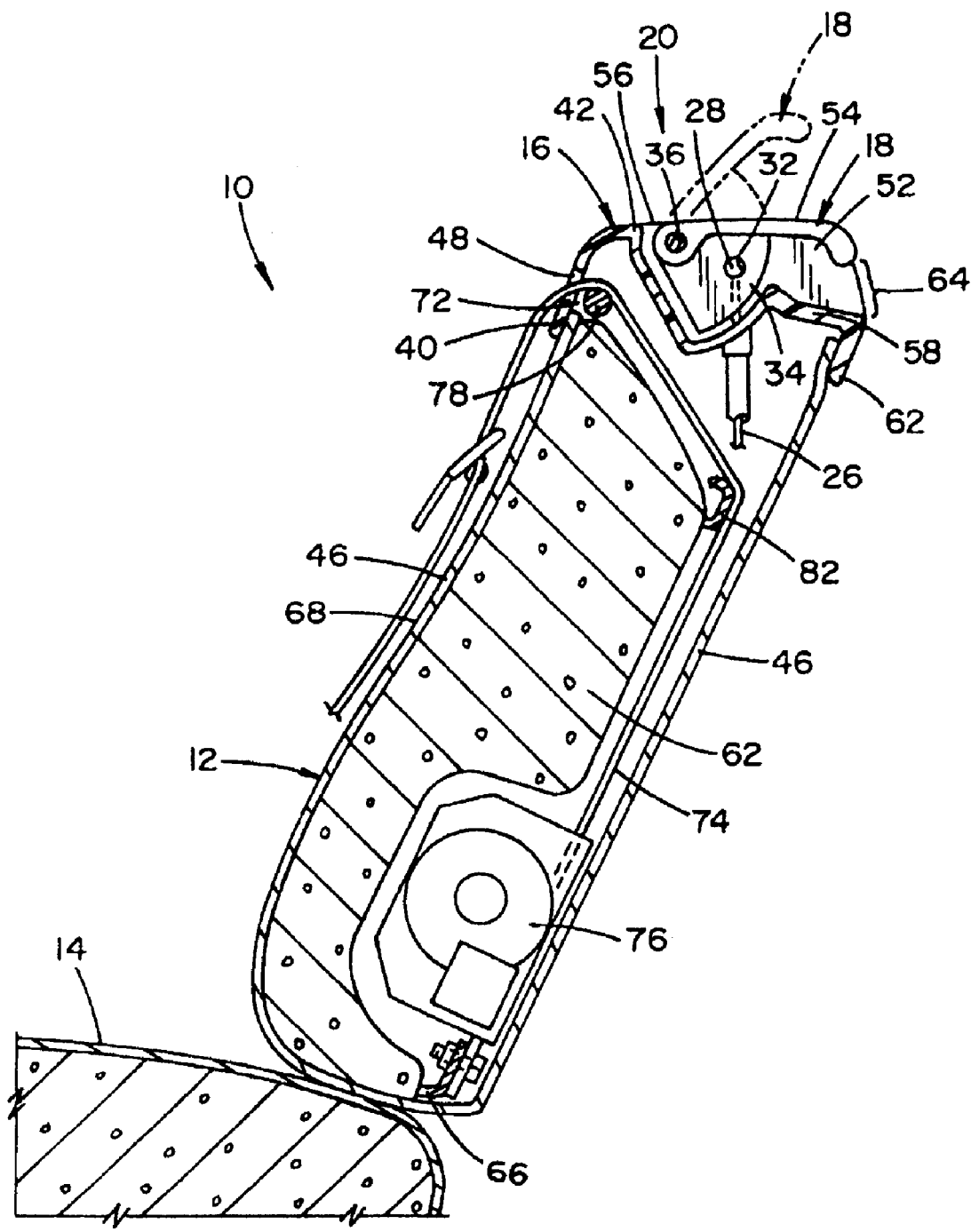
FIG. 3 is a cross-sectional view through the vehicle seat shown in FIGS. 1 and 2.

With reference to FIG. 3, a cable 26 is connected with the lever 18 and the latch 22 (FIG. 2). This is one example of how the lever can be operatively connected with the latch 22. Other manners of connection can be provided. In the embodiment depicted in FIG. 3, a hook 28 attaches to an upper (per the orientation in FIG. 3) end of the cable 26 and is received in an opening 32 formed in a downwardly depending flange 34 of the lever 18 to connect the cable to the lever. The cable 26 connects to the latch 22, (FIGS. 1 and 2) in such a manner that allows the latch to be retracted from, e.g., pivoted away from, engagement with the striker 24 to allow the seat back 12 to be movable away from the striker 24. With the latch 22 no longer engaging the striker 24, the seat back occupies an unlatched position, i.e., the latch is unlatched and the seat back 12 can freely pivot relative to the base 14. The arrangement of the latch 22 and the striker 24 shown in the depicted embodiment is high-latch arrangement. High-latch arrangements can be used on vehicle seats as a lightweight and simple means of holding the seat back 12 in position for occupation and selective releasing for use of a cargo area and/or ingress/egress to an area behind the seat. High-latch arrangements result in an overall lightweight seat design because the seat can rely on the vehicle body for cargo-retention strength and occupant loads in the event of a collision. Nevertheless, the vehicle seat assembly 20 can be used with other latching arrangements, including conventional-type latching arrangements.

The lever 18 can connect with the housing 16 via an axle or pin 36, which allows at least a portion of the lever to rotate with respect to the housing 16 about a rotational axis, which is defined by the axle 36. In the embodiment depicted in FIGS. 1-3, the lever 18 pivots about a generally horizontal axis, which is defined by the axle 36.

With continued reference to FIG. 3, the housing 16 can be an integrally formed piece or unit, which can be made of plastic or metal. The housing 16 connects with the seat back 12 adjacent the outer upper shoulder region of the seat back. The housing 16 can also be provided at the upper generally horizontal edge (when in the upright position) of the seat back 12. In the depicted embodiment, the housing 16 includes a forward face 40. The forward face 40 depends downwardly from and is integral with an upper wall 42. The forward face 40, and more specifically a rearward surface thereof, contacts a trim cover 46 for the pivotal seat back 12. The upper wall 42 of the housing 16 is generally horizontally oriented when the seat back 12 is in the upright position (see FIG. 3). The forward face 40 defines an elongate slot 48, which can operate as a seat belt opening.

In the embodiment depicted in FIGS. 1-3, the elongate slot 48 is formed in and extends through the forward face 40. The elongate slot 48, however, can be formed elsewhere in the housing 16, e.g. the upper wall 42. In the depicted embodiment, the lever 18 is disposed rearward and above the elongate slot 48. The lever 18 has a width in a transverse direction (with respect to the vehicle) that is less than a width of the elongate slot 48. This is most prevalent in FIG. 2. The elongate slot 48 can have a height and a width slightly larger than the height and width of a conventional seat belt. The unconventional location of the lever 18 with respect to the seat belt opening 48 provides a compact and attractive assembly. Additionally, the seat belt exit can be removed from the pillar and located near the lever 18 to provide the extraordinary benefit of a cleaner looking vehicle interior.

The upper wall 42 of the housing 16 generally defines a recess 52. In the depicted embodiment, the recess 52 is disposed rearwardly from the forward face 40. The downwardly depending flange 34 of the lever 18 is disposed within this recess 52 such that an uppermost surface 54 of the lever 18, when in the retracted position (shown at solid lines in FIG. 3), is generally flush with an uppermost surface 56 of the upper wall 42. The recess 52 is also defined by a lower base wall 58 of the housing 16. The lower base wall 58 can be curved (see FIG. 3) to accommodate the curved downwardly depending flange 34 of the lever 18. The lower base wall 58 can take alternative configurations depending upon the configuration of the lever 18 and the flange 34.

The housing 16 also includes a rear wall 62 that depends downwardly from and is integrally formed with the base wall 58. The rear wall 62, more particularly a forward surface thereof, also contacts the trim cover 46 of the vehicle seat back 12 on the rear side of the seat back. A clearance 64 is provided between a portion of the lever 18 and the base wall 58 above the rear wall 62. The clearance 64 provides an access location for an operator's fingers to be inserted between the lever 18 and the base wall 58 to operate the lever. In the depicted embodiment, the clearance 64 is provided adjacent a rear section of the housing 16.

With reference back to FIG. 3, the pivotal seat back 12 includes the trim cover 46 that surrounds foam 62 and an internal frame 66 (only a portion thereof is shown in FIG. 3). The seat back 12 includes a seat belt exit opening 72 extending through a seat back surface 68 adjacent an outer upper shoulder region of the seat back. A portion of the seat back surface 68 is contacted by the back of a vehicle occupant sitting on the vehicle seat 10. The seat belt exit opening 72 aligns with the seat belt opening 48 in the housing 16. In view of this, an integral seat belt 74, e.g. a seat belt at least partially disposed within the seat back 12, exits the seat back 12 and the housing 16 at an angle that is transverse to the seat back surface 68 so that little if any horizontally oriented load is carried by the trim cover 46 or the housing 16 as the seat belt 74 is pulled generally in the horizontal direction.

With continued reference to FIG. 3, the seat belt 74 is wound around a seat belt retractor 76, which in the depicted embodiment is disposed within the pivotal seat back 12 adjacent a lower portion of the seat back. The seat belt retractor 76 depicted in FIG. 3 can be a known seat back retractor assembly.

A first (upper) seat belt guide 78 connects with the housing 16 and/or the internal frame 66. The seat belt 74 contacts the first seat belt guide 78. More specifically, the seat belt 74 rides over a first seat belt guide 78, which is positioned adjacent the seat belt opening 48 of the housing 16 and above the seat belt exit opening 72. The first seat belt guide 78 can carry horizontal and vertical loads imposed upon it by the seat belt 74. The first seat belt guide 78 can carry these loads as opposed to the loads being imposed upon the housing 16.

A second (lower) seat belt guide 82 can be provided within the pivotal seat back 12 and be spaced from the housing 16. The second seat belt guide 82 connects with the internal frame 66. The seat belt 74 contacts the second seat belt guide 82. The second seat belt guide 82 can also carry horizontal and vertical loads imposed upon it by the seat belt.

A vehicle seat assembly and a vehicle seat have been described with reference to particular embodiments. Modifications and alterations will occur to those upon reading and understanding the preceding detailed description. The invention is not limited to only those embodiments described above. Instead, the invention is broadly defined by the appended claims and the equivalents thereof.

What is claimed is:

1. A vehicle seat assembly comprising:
   a vehicle seat fold down lever; and
   a vehicle seat fold down lever housing connected with the lever such that the lever is movable with respect to the housing, the housing including an elongate slot through which an associated seat belt exits the housing, wherein the lever is disposed rearward and above the elongate slot, wherein the housing includes an uppermost wall, a forward face depending from the uppermost wall, the elongate slot positioned in the forward face, and the uppermost wall defines a recess, wherein at least a portion of the lever is received in the recess.

2. The assembly of claim 1, wherein the lever pivots about a generally horizontal axis.

3. The assembly of claim 1, further comprising a cable connected with the lever and with a latch, the latch being configured to cooperate with a striker.

4. The assembly of claim 1, wherein the elongate slot has a height and a width slightly larger than the height and width of a conventional seat belt.

5. The assembly of claim 1, wherein the lever has a width in a transverse direction that is less than a width in a transverse direction of the elongate slot.

6. The assembly of claim 1, wherein the housing includes a base wall and an upper wall, wherein the upper wall and the base wall of the housing define a recess, at least a portion of the lever being disposed in the recess and a clearance being provided between a portion of the lever and the base wall, the clearance providing an access location for an associated operator's fingers to be inserted between the lever and the base wall to operate the lever.

7. The assembly of claim 6, wherein the housing includes a forward face depending from the upper wall, the elongate slot being provided in the forward face.

8. A vehicle seat comprising:
a pivotal seat back movable between a latched position and an unlatched position;
a housing connected with the seat back and including a base wall and a seat belt opening;
a movable lever connected with the housing, movement of the lever allowing for pivotal movement of the seat back from the latched position, wherein a clearance is provided between a portion of the lever and the base wall, the clearance providing an access location for an associated operator's fingers to be inserted between the lever and the base wall to operate the lever;
a seat belt at least partially disposed in the seat back, a portion of the seat belt exiting the seat back through the seat belt opening in the housing;
a first seat belt guide disposed within the seat back and connected with the housing or an internal frame of the vehicle seat, the seat belt contacting the first seat belt guide; and
a second seat belt guide disposed within the seat back and spaced from the housing, the seat belt contacting the second seat belt guide.

9. The vehicle seat of claim 8, wherein the seat back includes a trim cover surrounding the internal frame, and the housing connects with the vehicle seat adjacent an outer shoulder region of the vehicle seat and contacts an external surface of the trim cover.

10. The vehicle seat of claim 9, wherein the housing includes a forward face depending from an upper wall, the seat belt opening being provided in the forward face.

11. The vehicle seat of claim 10, wherein the upper wall of the housing is generally horizontally oriented when the seat back is in an upright position.

12. The vehicle seat of claim 11, wherein the upper wall and the base wall of the housing define a recess disposed rearwardly from the forward face, at least a portion of the lever being disposed in the recess.

13. The vehicle seat of claim 10, wherein the seat belt opening has a height and a width slightly larger than the height and width of a conventional seat belt, and the lever is disposed rearward and above the seat belt opening and the lever having a width in a transverse direction that is less than a width in a transverse direction of the seat belt opening.

14. The vehicle seat of claim 8, wherein the clearance is provided adjacent a rear section of the housing.

15. The vehicle seat of claim 8, further comprising a cable and a latch, the cable connected with the lever and the latch, movement of the lever resulting in movement of the latch, and the latch being configured to cooperate with an associated striker.

16. The vehicle seat of claim 8, further comprising a seat belt retractor in the seat back adjacent a lower portion of the seat back, the seat belt wound around the seat belt retractor.

17. A vehicle seat comprising:
a pivotal seat back including a seat back surface, a portion of which being contacted by the back of an associated vehicle occupant sitting on the vehicle seat, the seat back being movable between an upright position and a collapsed position and including a seat belt exit opening extending through the seat back surface adjacent an outer upper shoulder region of the seat back;
a movable lever connected with the seat back adjacent the outer upper shoulder region of the seat back, movement of the lever allowing for pivotal movement of the seat back from the upright position;
a seat belt at least partially disposed inside the seat back, a portion of the seat belt exiting the seat back through the seat belt exit opening;
a housing connected with the seat back adjacent the outer upper shoulder region of the seat back and including a seat belt opening, the portion of the seat belt exiting the seat back through the seat belt opening; and
a seat belt guide disposed within the seat back and spaced from and below the housing, the seat belt contacting the seat belt guide wherein the housing includes a forward face depending from an upper wall, the seat belt opening being provided in the forward face.

18. The vehicle seat of claim 17, further comprising a cable and a latch, the cable connected with the lever and the latch, movement of the lever resulting in movement of the latch, and the latch being configured to cooperate with an associated striker.

19. The vehicle seat of claim 17, wherein the seat back includes an internal frame and a trim cover surrounding the internal frame, and the housing contacts an external surface of the trim cover.

* * * * *